United States Patent [19]
Furuta et al.

[11] Patent Number: 5,882,150
[45] Date of Patent: Mar. 16, 1999

[54] INDEXABLE END MILL

[75] Inventors: Sinji Furuta, Kure; Hirofumi Ueno, Nabari, both of Japan

[73] Assignee: Dijet Industrial Co., Ltd., Osaka, Japan

[21] Appl. No.: 895,234

[22] Filed: Jul. 16, 1997

[30]  Foreign Application Priority Data

Jul. 18, 1996 [JP] Japan .................................. 8-209222
Oct. 9, 1996 [JP] Japan .................................. 8-287551

[51] Int. Cl.⁶ ....................................................... B23C 5/20
[52] U.S. Cl. ............................. 407/42; 407/46; 407/49; 407/59; 407/63
[58] Field of Search ................................ 407/42, 35, 40, 407/41, 43, 46, 47, 48, 49, 51, 53, 56, 59, 63

[56]  References Cited

U.S. PATENT DOCUMENTS

| | | | |
|---|---|---|---|
| 4,182,587 | 1/1980 | Striegl | 407/59 X |
| 4,497,600 | 2/1985 | Kishimoto | 407/53 |
| 4,519,731 | 5/1985 | Jester et al. | 407/46 |
| 4,648,755 | 3/1987 | Stashko | 407/59 X |
| 4,684,297 | 8/1987 | Funakawa et al. | 407/49 X |
| 4,790,693 | 12/1988 | Koblesky | 407/42 X |
| 5,094,573 | 3/1992 | Hougan | 407/53 X |

*Primary Examiner*—Frances Han
*Assistant Examiner*—Henry W. H. Tsai
*Attorney, Agent, or Firm*—Armstrong, Westerman, Hattori, McLeland & Naughton

[57]  ABSTRACT

A indexable end mill of the present invention comprises a helical flute formed in the outer periphery of a shank as inclined at a required angle with respect to the axis of the shank, a plurality of indexable inserts attached to places in the helical flute rearwardly with respect to the axis of the rotated shank as spaced at required intervals along the helical flute, and recesses defined in the outer periphery of the shank as interposed between the indexable inserts.

12 Claims, 6 Drawing Sheets

INDEXABLE END MILL

BACKGROUND OF THE INVENTION

1. Field of the Invention

The present invention relates to a indexable end mill having a plurality of indexable inserts attached to the outer periphery of a shank and axially spaced at required intervals starting from the distal end of the shank.

2. Description of the Related Art

A variety of end mills have conventionally been utilized for grooving, corner milling, side milling and the like. Recently, indexable end mills have been adopted as a kind of such end mills. The indexable end mill is adapted for exchange of multiple indexable inserts attached to the outer periphery of the shank and axially spaced at required intervals starting from the distal end thereof.

More recently, the aforesaid indexable end mill has an arrangement generally shown in FIG. 1 for improvement of the cutting performance. More specifically, a shank 20 is formed with a plurality of right hand helical flutes 22 in the outer periphery thereof, each helical flute extending from the distal end of the shank 20 as inclined rearwardly in the direction of rotation of the shank and having a plurality of indexable inserts 10 sequentially attached thereto rearwardly with respect to the axis of the rotated shank and axially spaced at required intervals along the flute.

In the cutting of workpiece using such a indexable end mill, as shown in FIG. 2, the indexable end mill is rotated by a drive unit (not shown) while chips produced by outer-peripheral-side cutting edges of the indexable inserts are guided into the helical flutes 22 in the outer periphery 21 of the shank 20 so as to be discharged out of the flutes in conjunction with the rotation of the shank 20.

Unfortunately however, after guided into the aforesaid helical flutes 22 inclined at a required angle relative to the axis of the shank 20, the chips are moved in the helical flutes 22 due to the rotation of the shank 20, and then are caught and fused between the indexable inserts 10. Thus, the capability of discharging chips is reduced. Additionally, the caught chips build up in the helical flutes 22 to interfere with the rotation of the indexable end mill, resulting in an increased load on the indexable inserts 10 and shank 20. As a result, the breakage of the indexable inserts 20 or shank 20 occurs.

In case where a workpiece is subject to the cutting by means of the indexable end mill of the above structure, the indexable inserts 10 at the distal end of the shank 20 first hit the workpiece, successively followed by the rest so that the workpiece is processed.

However, if the indexable inserts 10 hit the workpiece in sequence of from that at the distal end of the shank 20 or that farthest from place where the indexable end mill is mounted to the drive unit, the indexable end mill suffers a greater vibration during the cutting operation and becomes incapable of performing a precise cutting work.

In recent attempts to solve these problems, a indexable end mill as shown in FIG. 3 has been proposed (see Japanese Examined Utility Model Publication No.6(1994)-18733). This end mill is arrange such that a plurality of indexable inserts 10 are sequentially attached to the outer periphery 21 of the shank 20 at forward places with respect to the axis of the rotated shank as axially spaced at required intervals starting from the distal end of the shank. On the other hand, the shank 20 is formed with helical flutes 22 for discharging chips produced by the indexable inserts 10, the flutes 22 being defined forwardly of the indexable inserts 10 in the direction of rotation of the shank and extended from the distal end of the shank as inclined forwardly in the direction of rotation of the shank.

In the indexable end mill of FIG. 3, the indexable inserts 10 are arranged on the outer periphery 21 of the shank 20 in a left hand helix starting from the distal end thereof, as forwardly shifted one after another with respect to the axis of the rotated shank. When the indexable end mill of this arrangement is mounted to and rotated by the drive unit for cutting a workpiece, the indexable inserts 10 closest to the drive unit first hit the workpiece, successively followed by the rest of the indexable inserts 10 whereby the workpiece is processed. As compared with the indexable end mill shown in FIG. 1, this indexable end mill suffers a reduced vibration during the cutting operation, thus allowed to perform the precise cutting work.

In the indexable end mills of FIGS. 1 and 3, however, the indexable inserts 10 are attached to the shank with their respective outer-peripheral-side cutting edges 11 inclined at a small angle with respect to the axis of the shank 20. In case where the workpiece is subject to the cutting by means of the outer cutting edges 11 of the indexable inserts 10 having a small inclination, a great cutting resistance is exerted on the respective outer cutting edges 11 of the indexable inserts 10. The great cutting resistance causes breakage of the cutting edge 11 or an impulsive sound during the cutting operation. In addition, the chips produced from the cutting are slow to be separated from the cutting edges and tend to accumulate in spaces in the helical flutes 22 and between the indexable inserts 10.

In the prior-art indexable end mills as shown in FIGS. 1 and 3, the indexable inserts 10 are generally mounted to the outer periphery 21 of the shank 20 by using screws 1 through mount holes 12 formed in the respective indexable inserts 10.

With the indexable inserts 10 mounted to the shank 20 by means of the screws 1, each exchange of indexable inserts 10 requires the screw 1 to be unscrewed before exchanging the indexable inserts 10. Such an exchange of indexable inserts is cumbersome and time consuming, resulting in a poor working efficiency.

SUMMARY OF THE INVENTION

It is therefore, an object of the invention to provide a indexable end mill adapted to rotate for cutting a workpiece by means of a plurality of indexable inserts sequentially attached to the outer periphery of a shank and axially spaced at required intervals starting from the distal end of the shank, the end mill preventing chips produced by the cutting edges of the indexable inserts from being caught and fused between the indexable inserts, thereby assuring smooth discharge of the chips and a stable cutting performance over an extended period of time.

It is another object of the invention to provide a indexable end mill adapted to reduce a cutting resistance of the workpiece exerted on outer cutting edges of the indexable inserts, thereby providing a stable cutting performance of high efficiency.

It is still another object of the invention to provide a indexable end mill adapted to curb the vibration thereof during the cutting operation, thereby assuring a precise cutting work.

It is yet another object of the invention to provide a indexable end mill facilitating the exchange of indexable inserts.

In the indexable end mill according to a first mode of the invention, the helical flutes are formed in the outer periphery of the shank as inclined at a required angle with respect to the axis of the shank. A plurality of indexable inserts are attached to places in the helical flutes rearwardly with respect to the axis of the rotated shank, as spaced at required intervals along the flutes. The outer periphery of the shank is formed with recesses at gaps between the indexable inserts.

In the indexable end mill according to the first mode hereof which is rotated for cutting the workpiece by means of the cutting edges of the indexable inserts, if chips are produced from the cutting and guided into the helical flutes so as to be moved therein and into the gaps between the indexable inserts, the chips are not caught in the gaps but received by the recesses formed in the outer periphery of the shank and between the indexable inserts. Then, with the rotation of the indexable end mill, the chips received by the recesses are discharged out of the mill together with those in the helical flutes. Thus, the chips caught and fused between the indexable inserts are decreased.

As to the mounting of the indexable inserts to places along the helical flutes formed in the outer periphery of the shank of the aforesaid indexable end mill, it is preferred that the outer cutting edges of the indexable inserts have a rearward inclination of 10° to 50° with respect to the axis of the rotated shank.

With the outer cutting edges of the indexable inserts inclined at 10° to 50° rearwardly with respect to the axis of the rotated shank, the cutting edges are subject to a small cutting resistance from the workpiece and besides, the chips produced from the cutting are smoothly separated from the cutting edges. Thus is provided an efficient cutting operation. Despite the great inclination of the cutting edges of the indexable inserts, the chips are prevented from being caught between the indexable inserts by virtue of the recesses defined in the outer periphery of the shank and between the indexable inserts. Thus is provided a stable and efficient cutting operation. For a cutting operation of an even higher efficiency, the aforesaid inclination of the cutting edges is preferably in the range of between 30° to 50°.

In this indexable end mill, the indexable inserts are preferably mounted to the outer periphery of the shank along the helical flutes in a manner such that the indexable inserts are secured to places as clamped by means of wedges. The indexable inserts thus mounted may readily be removed from the outer periphery of the shank simply by unloosening the wedges. This dramatically facilitates the mounting or dismounting of the indexable inserts as compared with the prior-art mounting method using a screw for securing the indexable insert to the outer periphery of the shank. Hence, the exchange of indexable inserts may be carried out in a quick and simple manner.

In a indexable end mill according to a second mode hereof, a plurality of indexable inserts are sequentially attached to the outer periphery of the shank at forward places with respect to the axis of the rotated shank as axially spaced at required intervals starting from the distal end of the shank, whereas the outer cutting edges of the indexable inserts are inclined rearwardly with respect to the axis of rotated shank, the inclination thereof ranging from 20° to 50°.

When the indexable end mill according the second mode hereof is mounted to and rotated by the drive unit for cutting a workpiece, the indexable inserts closest to the drive unit first hit the workpiece, successively followed by the rest whereby the workpiece is processed. This contributes to a reduced vibration of the indexable end mill during the cutting operation and hence, the end mill is allowed to perform a precise cutting work.

In the indexable end mill according to the second mode hereof wherein the outer cutting edges of the indexable inserts have a great inclination of between 20° and 50°, the cutting edges are subject to a small cutting resistance during the cutting operation. This prevents the breakage of the cutting edges or the production of impulsive sound. Furthermore, the separation of the chips from the cutting edges is facilitated so that the chips caught between the indexable inserts are decreased. As a result, the workpiece may be processed in a stable and efficient manner.

In the indexable end mill according to the second mode hereof, the indexable inserts are attached to the outer periphery of the shank in the aforesaid manner wherein the indexable inserts are secured to places as clamped by means of the wedges. The indexable inserts thus mounted may readily be removed from the outer periphery of the shank simply by loosening the wedges.

Preferably, the indexable end mill according to the second mode hereof includes pockets for receiving the chips formed forwardly of the respective indexable inserts on the shank in the direction of rotation of the shank, and the helical flutes formed rearwardly of the indexable inserts in the direction rotation of the shank, the helical flutes extended from the distal end of the shank as inclined forwardly in the direction of rotation of the shank and communicated with the respective pockets. When the indexable end mill of this structure is rotated for cutting a workpiece in the aforementioned manner, the chips produced by the cutting edges of the indexable inserts are discharged into the pockets and then guided into the helical flutes from the pockets. The chips thus guided into the pockets or helical flutes are discharged out of the mill in conjunction with the rotation of the indexable end mill. This prevents the chips from being caught and fused between the indexable inserts and thus, the stable cutting operation of high efficiency is assured over an extended period of time.

In a indexable end mill according to a third mode hereof, a plurality of indexable inserts are sequentially attached to the outer periphery of the shank at forward places with respect to the axis of the rotated shaft as axially spaced at required intervals starting from the distal end of the shank, whereas the outer cutting edges of the indexable inserts are inclined forwardly with respect to the axis of the rotated shank at an angle of between 20° and 50°.

Similarly to the indexable end mill of the second mode hereof, when the indexable end mill of this mode is mounted to and rotated by the drive unit for cutting a workpiece, the indexable inserts closest to the drive unit first hit the workpiece, successively followed by the rest, whereby the workpiece is processed. This contributes to a reduced vibration of the indexable end mill during the cutting operation and thus, the indexable end mill is allowed to perform the precise cutting work. Additionally, the outer cutting edges of the indexable inserts are subject to a small cutting resistance and hence, the breakage of the indexable inserts or the production of impulsive sound during the cutting operation is decreased. Furthermore, the chips produced from the cutting are smoothly separated from the cutting edges so that the chips caught between the indexable inserts are decreased. Thus is assured that the workpiece is subject to the stable and efficient cutting work.

In the indexable end mill according to the third mode hereof, as well, the indexable inserts may be attached to the outer periphery of the shank as clamped by means of the wedges so that the indexable inserts may readily be removed from the outer periphery of the shank simply by loosening the wedges.

These and other objects, advantages and features of the invention will become apparent from the following description thereof taken in conjunction with the accompanying drawings which illustrate specific embodiment of the invention.

DESCRIPTION OF THE PREFERRED EMBODIMENTS

Now, detailed description will be made on preferred embodiments of the indexable end mill according to the invention.

EXAMPLE 1

Figure 4A:
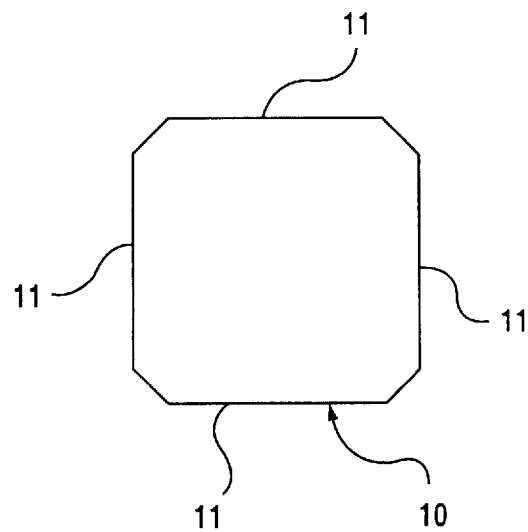
FIG. 4 includes a front elevation and a side elevation illustrating the indexable insert for use in the indexable end mill.
Figure 4B:
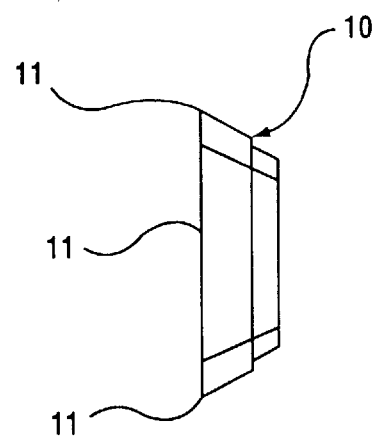

As shown in FIGS. 4A and 4B, a indexable insert 10 generally square in plan and chamfered at its four corners is employed by the indexable end mill in accordance with Example 1 of the invention.

On the other hand, a shank 20, to which the aforesaid indexable inserts are attached, is formed with multiple helical flutes 22 in the outer periphery 21 thereof, the helical flutes defined forwardly with respect to the axis of the rotated shank 20 (in the direction indicated by the arrow 'a' in the figure) and inclined at a required angle.

Figure 5:
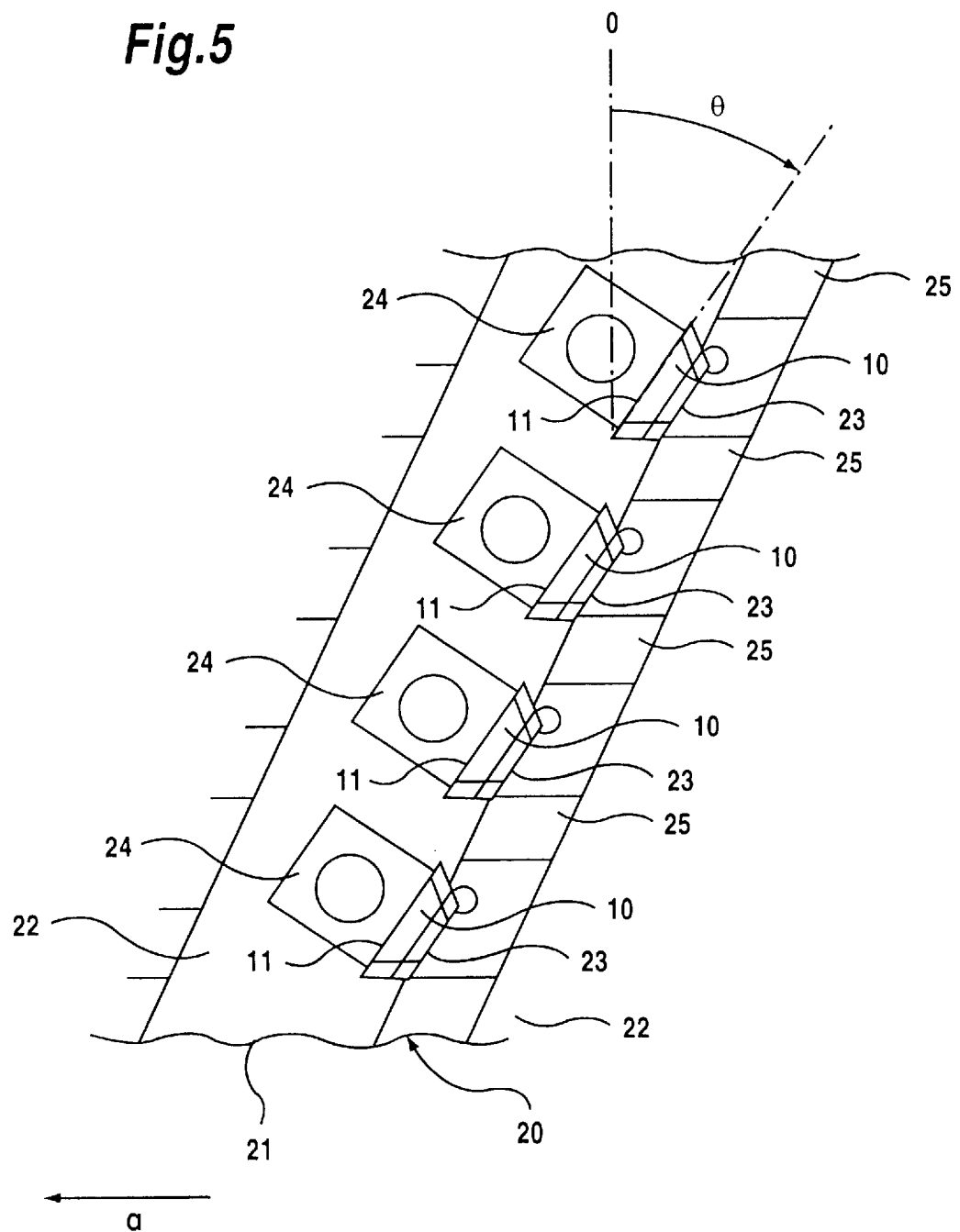
FIG. 5 is a fragmentary diagram of a indexable end mill according to a first example of the invention for illustrating a state wherein the indexable inserts are attached to places in a helical flute formed in the shank.

As shown in FIG. 5, a plurality of tip seats 23 for mounting the indexable inserts 10 are disposed at places in the helical flute 22 rearwardly with respect to the axis of the rotated shank 20, as spaced at required intervals. On the other hand, wedges 24 are disposed at places in the helical flute 22 in corresponding relation with the tip seats 23, respectively, so that the indexable inserts 10 are secured at places as clamped between the tip seats 23 and the wedges 24.

Figure 6:
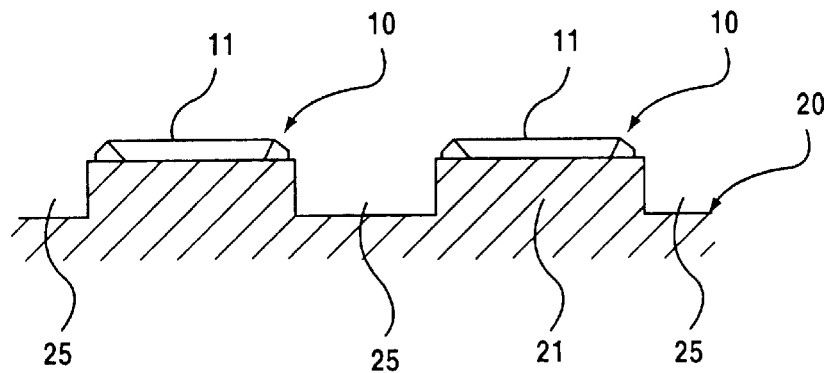
FIG. 6 is a fragmentary diagram of the indexable end mill of the first example hereof for illustrating a state wherein recesses are formed in the outer periphery of the shank and between the indexable inserts attached to the shank.

The indexable end mill of this example further includes recesses 25 formed in the outer peripheral portion 21 of the shank 20 interposed between adjacent helical flutes 22 mentioned above, and further, at places between adjacent tip seats 23 for mounting the indexable inserts 10, as shown in FIGS. 5 and 6. The recesses 25 serve to receive chips, as intercommunicating adjacent helical flutes 22.

In the indexable end mill of this example, the indexable inserts 10 are placed on the respective tip seats 23 in the helical flute 22 so as to be held between the tip seats 23 and the wedges disposed in the helical flute, respectively. In this manner, the indexable inserts 10 are mounted on the tip seats 23, respectively.

As to the mounting of the indexable inserts 10 on the tip seats 23 according to this example, outer-peripheral-side cutting edges 11 of the mounted indexable inserts 10 are inclined rearwardly with respect to the axis of the rotated shank 20, preferably at an angle θ of 10° to 50°, or more preferably of 30° to 50°.

When the indexable end mill of the example is rotated by a drive unit (not shown) to cut a workpiece, a length of cut is small because the indexable inserts 10 are attached to the helical flute 22 with their outer cutting edges inclined at a great angle θ with respect to the axis O of the shank 20. Hence, the cutting edges 11 are subject to a small cutting resistance and besides, the chips produced by the cutting edges 11 are smoothly separated therefrom. As a result, the cutting performance is improved.

During the cutting of workpiece by means of the cutting edges 11, the resultant chips are guided into the respective helical flutes 22 carrying the indexable inserts 10 thereon, where the chips are moved along the interior of helical flutes 22 as the shank 20 rotates. As guided into spaces between the indexable inserts 10, the chips are received by the recesses 25 defined in the outer peripheral portions 21 of the shank 20 and between the indexable inserts 10. As the shank 20 rotates, the chips thus received by the recesses 25 are successively discharged out of the mill jointly with the chips in the helical flutes 22. This prevents the chips from being caught and fused between the indexable inserts 10 and then from giving damage on the indexable inserts 10 or shank 10, which has been experienced in the prior-art end mills.

Further, the indexable end mill of the example is arranged such that the multiple indexable inserts 10 are mounted to places along the helical flutes 22 of the shank 20 as clamped between the wedges 24 and the tip seats 23, respectively. With this arrangement, the indexable inserts 10 may readily be removed from the tip seat 23 simply by loosening the wedges 24. This dramatically facilitates the exchange of indexable inserts 10.

EXAMPLE 2

The indexable end mill according to a second example hereof also employs the same indexable inserts 10 as those in Example 1 which are generally square in plan and chamfered at the four corners thereof.

Figure 7:
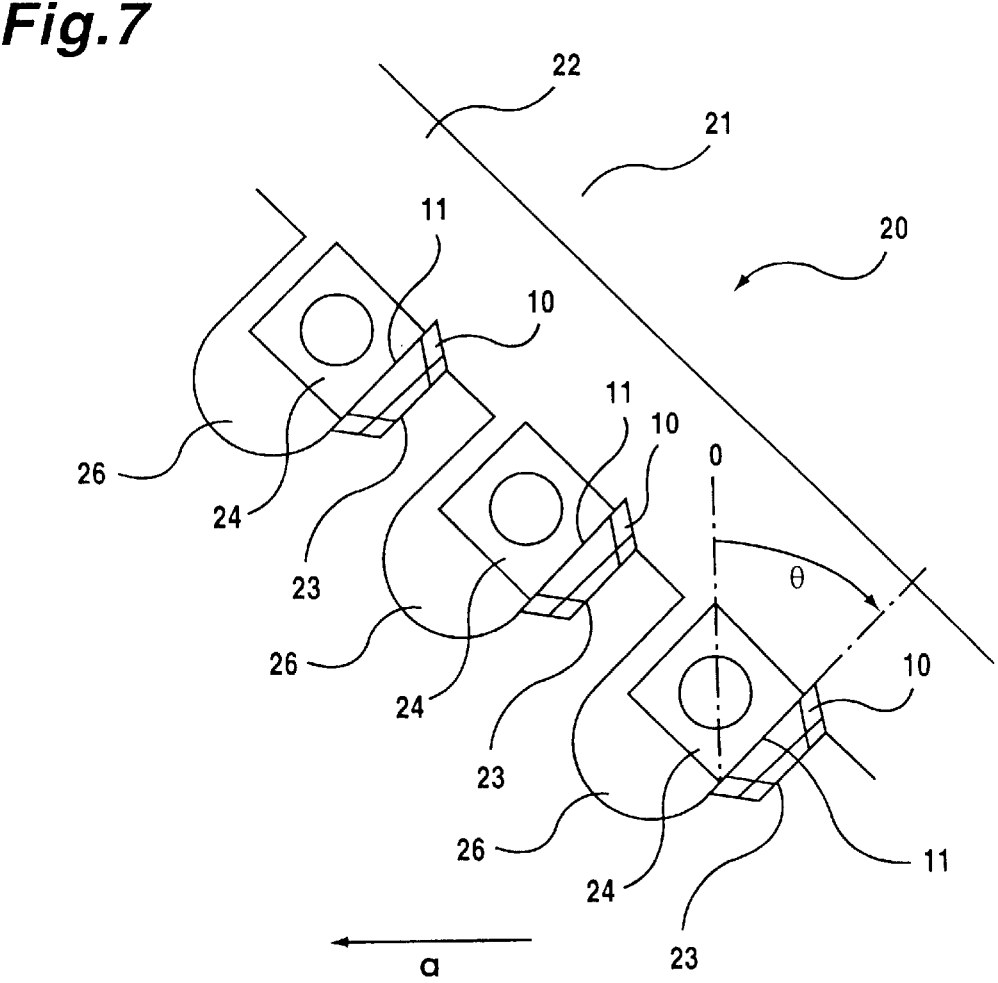
FIG. 7 is a fragmentary diagram of the indexable end mill according to a second example hereof for illustrating a state wherein the indexable inserts are attached to the outer periphery of the shank.

As to the shank 20 to which the indexable inserts 10 are mounted, as shown in FIG. 7, a plurality of tip seats 23 for mounting the indexable inserts 10 are sequentially attached to the outer peripheral portion 21 of the shank 20 at forward places with respect to the axis of the rotated shank 20 (in the direction of the arrow 'a' in the figure), as axially spaced at required intervals from the distal end of the shank.

The outer peripheral portion 21 of the shank 20 is formed with pockets 26 for receiving the chips produced from the cutting, the pockets defined forwardly of the respective tip seats 23 in the direction of rotation of the shank 20. The pockets 26 include the wedges 24 for holding the indexable inserts 10 between the wedges and the tip seats 23, respectively.

The outer peripheral portion 21 of the shank 20 is formed with a left hand helical flute 22 rearwardly of the tip seats 23 of the indexable inserts 10 in the direction of rotation of the shank 20, the helical flute 22 extended from the distal end of the shank 20 as inclined forwardly at a required angle with respect to the axis of the rotated shank 20. The helical flute 22 is communicated with the pockets 26. It should be noted here that the number of lines of the tip seats 23 and the number of helical flutes provided at the outer periphery 21 of the shank 20 are not particularly specified and may be properly changed based on the size of the shank 20 used.

The indexable end mill of this example is also arranged such that the indexable inserts 10 are placed on the respective tip seats 23 so as to be held between the seats 23 and the wedges 24 disposed in the respective pockets 26 whereby the indexable inserts 10 are mounted to the tip seats 23 as inclined rearwardly with respect to the axis of the rotated shank 20.

As to the mounting of the indexable inserts 10 to the respective tip seats 23 according to this example, the indexable inserts 10 are mounted to the tip seats 23 with their respective outer cutting edges 11 inclined rearwardly with respect to the axis O of the rotated shank 20, at an angle θ of 20° to 50°, or more preferably of 30° to 50°.

Figure 1:
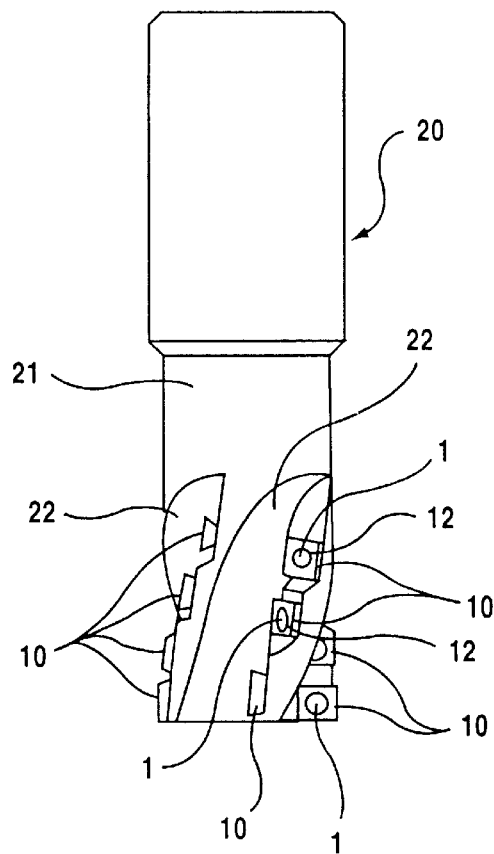
FIG. 1 is a schematic diagram illustrating a prior-art indexable end mill wherein a plurality of indexable inserts are sequentially attached to a shank at rearward places with respect to the axis of the rotated shank as spaced at required intervals from the distal end of the shank.
Figure 2:
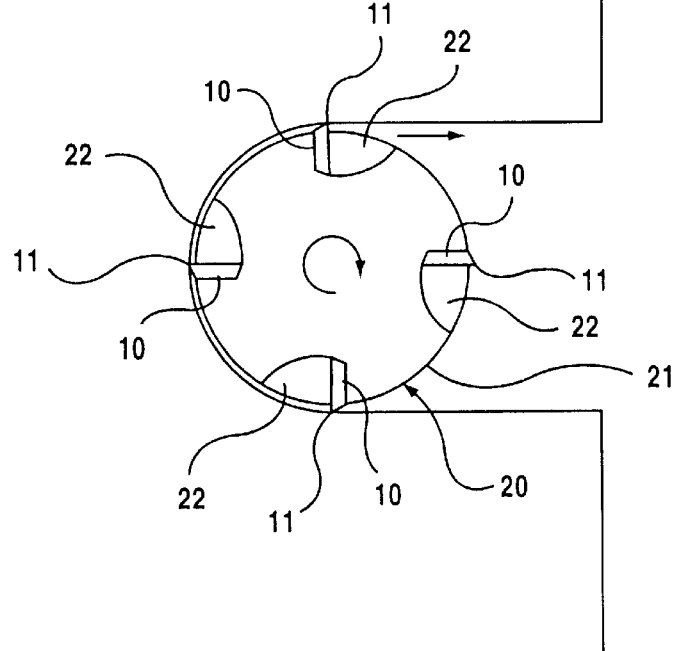
FIG. 2 is a schematic diagram illustrating a state wherein a workpiece is cut by the indexable end mill.
Figure 3:
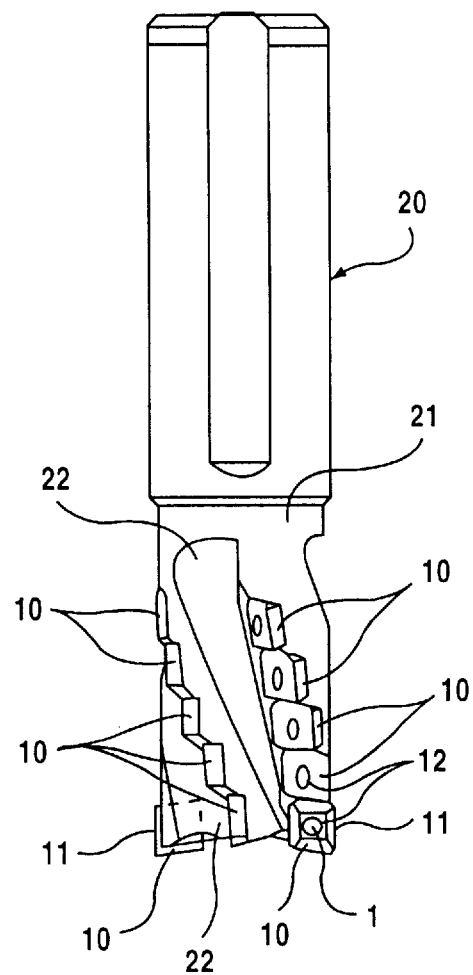
FIG. 3 is a schematic diagram illustrating another prior-art indexable end mill wherein a plurality of indexable inserts are sequentially attached to the shank at forward places with respect to the axis of the rotated shank as spaced at required intervals from the distal end of the shank.

When the indexable end mill of this example is mounted to and rotated by the drive unit (not shown) for cutting the workpiece, the indexable inserts 10 closest to the drive unit first hit the workpiece, successively followed by the rest, whereby the workpiece is processed in a similar manner to that of the prior-art indexable end mill of FIG. 3. This contributes to a reduced vibration of the indexable end mill during the cutting operation and hence, the end mill is allowed to perform the precise cutting work.

In the indexable end mill of this example, the outer cutting edges 11 of the indexable inserts 10 are inclined at a great angle θ with respect to the axis O of the shank 20, resulting in a small length of cut. Hence, the respective cutting edges 11 are subject to a small cutting resistance during the cutting operation. Additionally, the resultant chips are smoothly separated from the cutting edges. As a result, the cutting performance is improved.

During the cutting of the workpiece by means of the cutting edges 11 as mentioned above, the resultant chips are discharged into the pockets 26 disposed forwardly of the tip seats 23 supporting the indexable inserts 10 in the direction of rotation of the shank. As the indexable end mill rotates, the chips thus discharged are guided from the respective pockets 26 into the helical flute 22 so as to be accommodated therein. This prevents the chips from being caught in spaces between the indexable inserts 10 thereby assuring that the resultant chips are successively discharged out of the mill via the pockets 26 and the helical flutes 22 in conjunction with the rotation of the indexable end mill.

Similarly to Example 1, the indexable end mill of this example is also arranged such that the indexable inserts 10 are mounted to the tip seats 23 as held between the wedges 24 and the tip seats 23, respectively. Accordingly, the indexable inserts 10 may readily be removed from the tip seats 23 simply by loosening the wedges 24. As a result, the exchange of indexable inserts 10 is dramatically facilitated.

EXAMPLE 3

The indexable end mill according to a third example hereof also employs the same indexable inserts 10 as those in Examples 1 and 2 mentioned above. The indexable inserts are generally square in plan and chamfered at four corners thereof.

Figure 8:
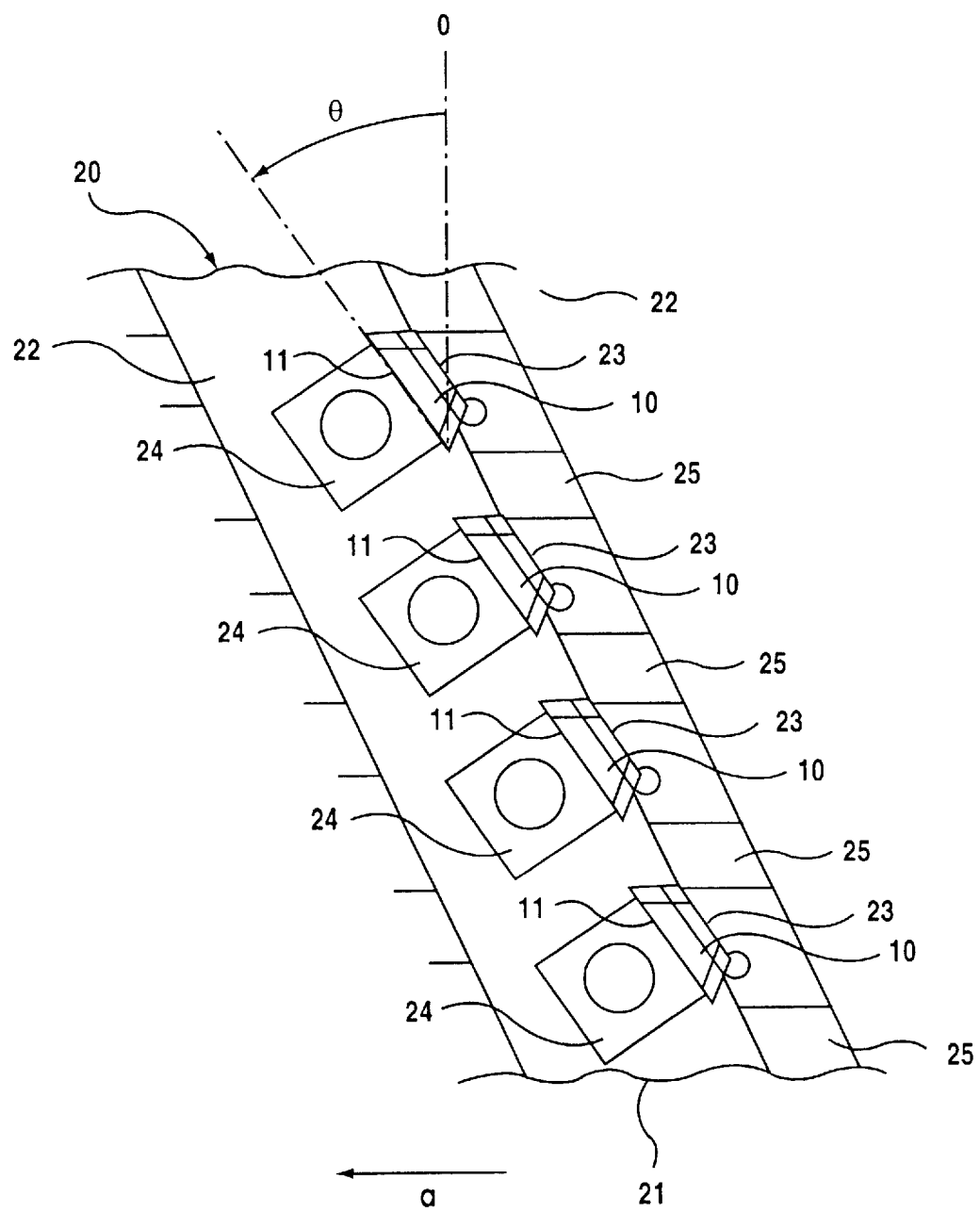
FIG. 8 is a fragmentary diagram of the indexable end mill according to a third example hereof for illustrating a state wherein the indexable inserts are attached to the outer periphery of the shank.

In the indexable end mill of this example shown in FIG. 8, a plurality of tip seats 23 for mounting the indexable inserts 10 to the shank 20 are sequentially attached to the outer peripheral portion 21 of the shank 20 at forward places with respect to the axis the rotated shank 20 (in the direction shown by the arrow 'a' in the figure) and axially spaced at required intervals from the distal end of the shank 20.

The outer peripheral portion 21 of the shank 20 is formed with a left hand helical flute 22 forwardly of the tip seats 23 in the direction of rotation of the shank 20, the helical flute extending from the distal end of the shank 20 as inclined forwardly with respect to the axis of the rotated shank 20. The helical flute 22 includes the wedges 24 such that the indexable inserts are secured to places as held between the wedges 24 and the tip seats 23, respectively. Similarly to Example 1, the indexable end mill of this example includes the recesses 25 defined between the tip seats 23 for mounting the indexable inserts 19 and intercommunicating adjacent helical flutes 22.

The indexable end mill of this example is also arranged such that the indexable inserts 10 are placed on the respective tip seats 23 and held between the seats and the wedges 24 disposed in the helical flute 22 so as to be secured to the respective tip seats 23.

In the indexable end mill of this example, the indexable inserts 10 on the tip seats 23 are held between the tip seats 23 and the wedges 24 but inversely to Example 2, the indexable inserts 10 on the tip seats 23 are inclined forwardly with respect to the axis of the rotated shank 20.

As to the mounting of the indexable inserts 10 on the respective tip seats 23 according to this example, the respective outer cutting edges 11 of the indexable inserts 10 on the tip seats 23 have a forward inclination θ of 20° to 50°, or more preferably of 30° to 50° with respect to the axis O of the rotated shank 20.

Similarly to the indexable end mill of Example 2, when the indexable end mill of this example is mounted to and rotated by the drive unit (not shown) for cutting the workpiece, the indexable inserts 10 closest to the drive unit first hit the workpiece, successively followed by the rest, whereby the workpiece is processed. This contributes to a reduced vibration of the indexable end mill during the cutting operation so that the end mill is allowed to perform the precise cutting work.

Since the indexable inserts 10 are mounted to places with their outer cutting edges 11 inclined at a great angle θ with respect to the axis O of the shank 20, the cutting edges 11 present a small length of cut similarly to the aforesaid Examples 1 and 2. Hence, the cutting edges 11 are subject to a small cutting resistance and besides, the resultant chips are smoothly separated therefrom. As a result, the cutting performance is improved.

During the cutting of the workpiece by means of the cutting edges 11 of the indexable inserts 10, the chips produced from the cutting are discharged into the respective helical flutes 22 extended forwardly of the indexable inserts 10 in the direction of rotation. The chips thus discharged are moved along the interior of the helical flutes to be guided into spaces between the indexable inserts 10, where, similarly to Example 1, the chips are received by the recesses 25 defined in the outer peripheral portion of the shank 20 and between the indexable inserts 10. As the shank 20 rotates, the chips thus received by the recesses 25 are successively discharged out of the mill jointly with the chips in the helical flutes 22.

The indexable end mill of this example is also arranged such that the indexable inserts 10 are held between the wedges 24 and the tip seats 23, thus dramatically facilitating the exchange of indexable inserts 10.

Although the indexable end mills of Examples 1 to 3 employ the indexable inserts 10 generally square in plan, it is obvious to those skilled in the art that the shape of a usable indexable insert 10 is not limited to the above. For example, a indexable insert may be generally triangle or parallelogram in plan.

Although the present invention has been fully described by way of examples, it is to be noted that various changes and modifications will be apparent to those skilled in the art. Therefore, unless otherwise such changes and modifications depart from the scope of the present invention, they should be construed as being included therein.

What is claimed is:

1. An indexable end mill comprising:
    a shank having a distal end, an outer periphery and a longitudinal axis through a center thereof;
    a plurality of helical flutes formed in said outer periphery of said shank, wherein each helical flute of said plurality of helical flutes is inclined at a predetermined angle with respect to said longitudinal axis of said shank so that each helical flute of said plurality of helical flutes is a right-hand helical flute;
    a plurality of indexable inserts mounted within each helical flute of said plurality of helical flutes and are spaced at predetermined intervals along each helical flute of said plurality of helical flutes;
    recesses defined in said outer periphery of said shank so as to extend from one helical flute of said plurality of helical flutes to another helical flute of said plurality of helical flutes, wherein said recesses are interposed between said plurality of indexable inserts;
    a plurality of wedge means for clamping said plurality of indexable inserts to an outer surface of each helical flute of said plurality of helical flutes;
    a plurality of tip seat means for mounting said plurality of indexable inserts within said helical flute, wherein said plurality of tip seat means are disposed at places on said outer surface of each helical flute of said plurality of helical flutes at spaced intervals; and
    wherein said plurality of wedge means cooperate with said plurality of tip seat means to hold said plurality of indexable inserts in place in each helical flute of said plurality of helical flutes.

2. The indexable end mill of claim 1, wherein outer-peripheral-side cutting edges of said plurality of indexable inserts are inclined rearwardly with respect to said axis of said shank at an angle of between 20° and 50°.

3. The indexable end mill of claim 1, wherein outer-peripheral-side cutting edges of said plurality of indexable inserts are inclined rearwardly with respect to said axis of said shank at an angle of between 30° and 50°.

4. An indexable end mill comprising:
    a shank having a distal end, an outer periphery, and a longitudinal axis through a center thereof;
    a plurality of helical flutes formed in said outer periphery of said shank, wherein each helical flute of said plurality of helical flutes is inclined at a predetermined angle with respect to said longitudinal axis of said shank so that each helical flute of said plurality of helical flutes is a left-hand helical flute;
    a plurality of indexable inserts sequentially attached to said outer periphery of said shank within each helical flute of said plurality of helical flutes at axially spaced intervals starting from said distal end of said shank, wherein said indexable inserts have outer-peripheral-side cutting edges which are inclined at an angle of between 20° and 50° with respect to said axis of said shank;
    a plurality of wedge means for clamping said plurality of indexable inserts to said outer periphery of said shank;
    a plurality of tip seat means for mounting said plurality of indexable inserts to said outer periphery of said shank, wherein said plurality of tip seat means are disposed at places on said outer periphery of said shank at spaced intervals; and
    wherein said plurality of wedge means cooperate with said plurality of tip seat means to hold said plurality of indexable inserts in place on said outer periphery of said shank.

5. The indexable end mill of claim 4, wherein said outer-peripheral-side cutting edges are inclined at an angle of between 30° and 50° with respect to said axis of said shank.

6. The indexable end mill of claim 4, further comprising pocket means for receiving chips cut by said outer-peripheral-side cutting edges of said plurality of indexable inserts, wherein said pocket means are defined at places forward of said plurality of indexable inserts on said shank in a direction of rotation of said shank, wherein said pocket means communicate with at least one helical flute which is formed in said outer periphery of said shank.

7. An indexable end mill comprising:
    a shank having a distal end, an outer periphery and a longitudinal axis through a center thereof;
    a plurality of indexable inserts sequentially attached to said outer periphery of said shank at spaced intervals starting from a distal end of said shank, wherein said indexable inserts have outer-peripheral-side cutting edges which are inclined at an angle of between 20° and 50° with respect to said axis of said shank;
    a plurality of wedge means for clamping said plurality of indexable inserts to said outer periphery of said shank;
    a plurality of tip seat means for mounting said plurality of indexable inserts to said outer periphery of said shank, wherein said plurality of tip seat means are disposed at places on said outer periphery of said shank at spaced intervals; and
    wherein said plurality of wedge means cooperate with said plurality of tip seat means to hold said plurality of indexable inserts in place on said outer periphery of said shank.

8. The indexable end mill of claim 7, wherein said outer-peripheral-side cutting edges have an inclination of between 30° and 50° with respect to said axis of said shank.

9. An indexable end mill comprising:
    a shank having a distal end, an outer periphery, and a longitudinal axis through a center thereof;

a plurality of helical flutes formed in said outer periphery of said shank, wherein each helical flute of said plurality of helical flutes is inclined at a predetermined angle with respect to said axis of said shank;

a plurality of indexable inserts mounted within each helical flute of said plurality of helical flutes; and recesses formed in said outer periphery of said shank, wherein said recesses are interposed between adjacent helical flutes of said plurality of helical flutes at places between adjacent tip seats for mounting said plurality of indexable inserts and allow communication between said adjacent helical flutes of said plurality of helical flutes.

10. The indexable end mill of claim 9, wherein each indexable insert of said plurality of indexable inserts includes an outer-peripheral-side cutting edge so that said outer-peripheral-side cutting edges are inclined rearwardly with respect to said axis of said shank at an angle of between 20° and 50°.

11. The indexable end mill of claim 9, wherein each indexable insert of said plurality of indexable inserts includes an outer-peripheral-side cutting edge so that said outer-peripheral-side cutting edges are inclined rearwardly with respect to said axis of said shank at an angle of between 30° and 50°.

12. The indexable end mill of claim 9, wherein each indexable insert of said plurality of indexable inserts are attached to said outer periphery of said shank by being clamped by wedges.

* * * * *